H. C. BAINES.
TRANSMISSION.
APPLICATION FILED FEB. 28, 1920.

1,421,375.

Patented July 4, 1922.

3 SHEETS—SHEET 1.

Inventor,
Henry C. Baines
By Hull, Smith, Brock & West.
Attys.

Inventor,
Henry C. Baines
By Hull, Smith, Birch & Wear
Attys.

H. C. BAINES.
TRANSMISSION.
APPLICATION FILED FEB. 28, 1920.

1,421,375.

Patented July 4, 1922.
3 SHEETS—SHEET 3.

UNITED STATES PATENT OFFICE.

HENRY C. BAINES, OF EAST CLEVELAND, OHIO, ASSIGNOR TO THE BAINES ENGINEERING COMPANY, OF CANAL DOVER, OHIO, A CORPORATION OF OHIO.

TRANSMISSION.

1,421,375. Specification of Letters Patent. Patented July 4, 1922.

Application filed February 28, 1920. Serial No. 362,060.

*To all whom it may concern:*

Be it known that I, HENRY C. BAINES, a subject of the King of Great Britain, residing at East Cleveland, in the county of Cuyahoga and State of Ohio, have invented a certain new and useful Improvement in Transmission, of which the following is a full, clear, and exact description, reference being had to the accompanying drawings.

This invention relates to power transmissions and more particularly to transmissions of the type employing a gear revolving within a track or second gear, such being commonly termed a hunting gear by those skilled in the art.

Heretofore the hunting gear has not found a wide range of use in general applications because the numerous parts and complicated method of transmitting the power from the driving to the driven shaft resulted in inefficient operation and a large loss of power. My invention, however, greatly reduces the number of parts heretofore required and transmission of power is accomplished with an efficiency that compares favorably with the most efficient and improved form of gearing.

Some of the objects of the present invention are to provide a transmission which will have a wide difference in speed between the driving and driven shafts; to provide a transmission which shall occupy an extremely small space and yet be capable of withstanding heavy loads; to provide a transmission of this type which shall operate with high efficiency with little loss of power due to friction of the parts; to provide a transmission of the aforesaid characteristics which shall consist of few and simple parts that are inexpensive to manufacture, while further objects and advantages will appear as the description proceeds.

Figure 1:
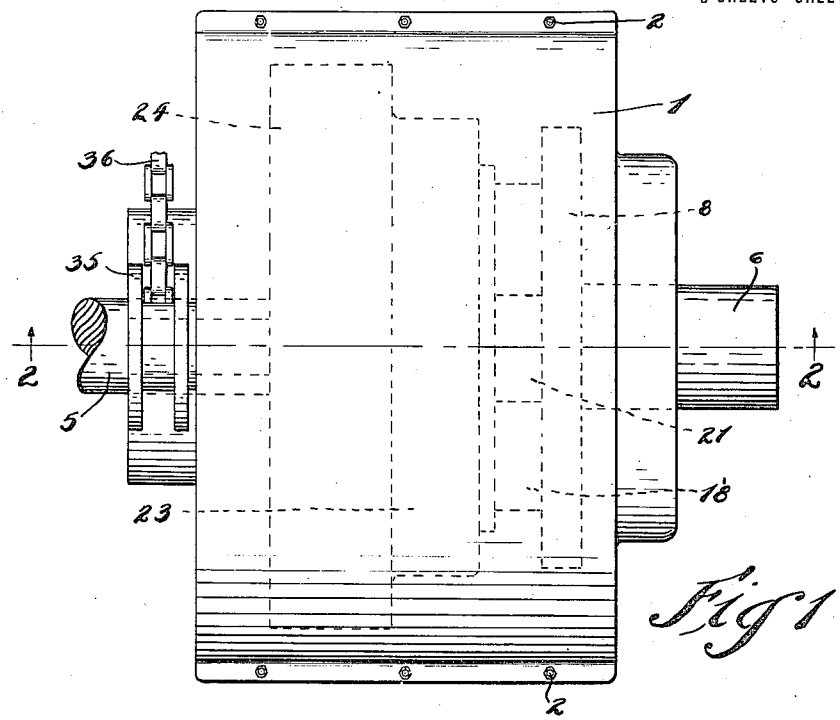
Figure 2:
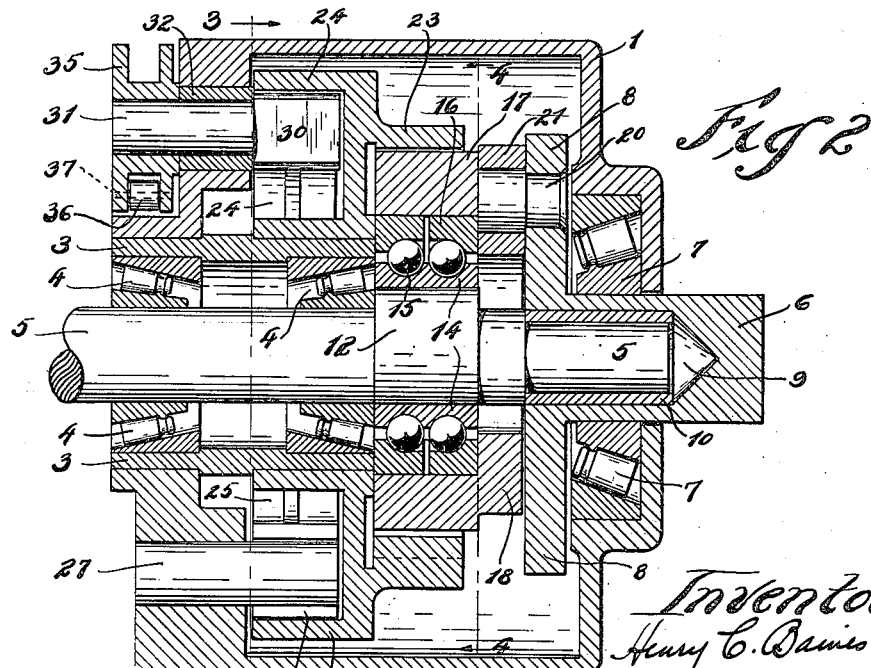
Figure 3:
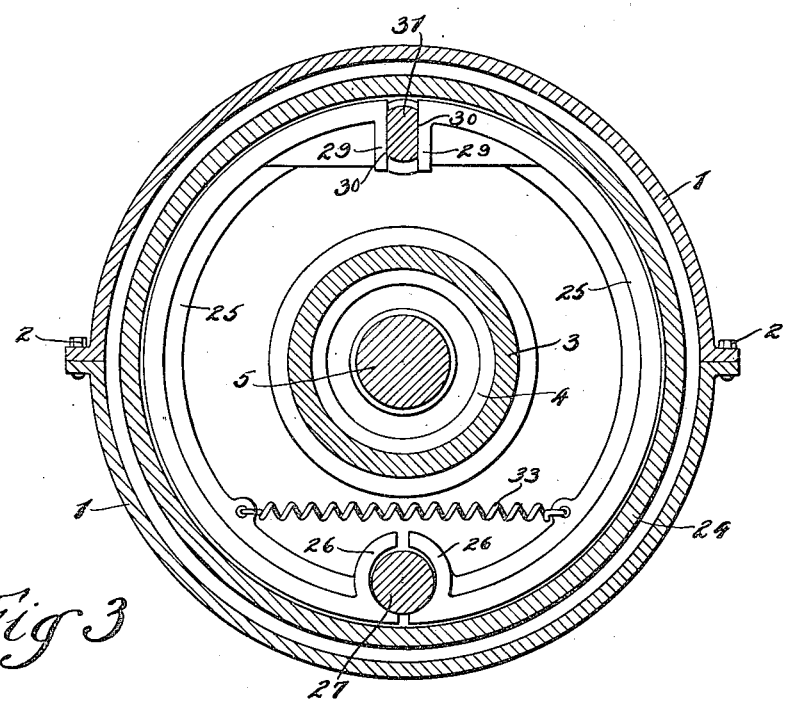
Figure 4:
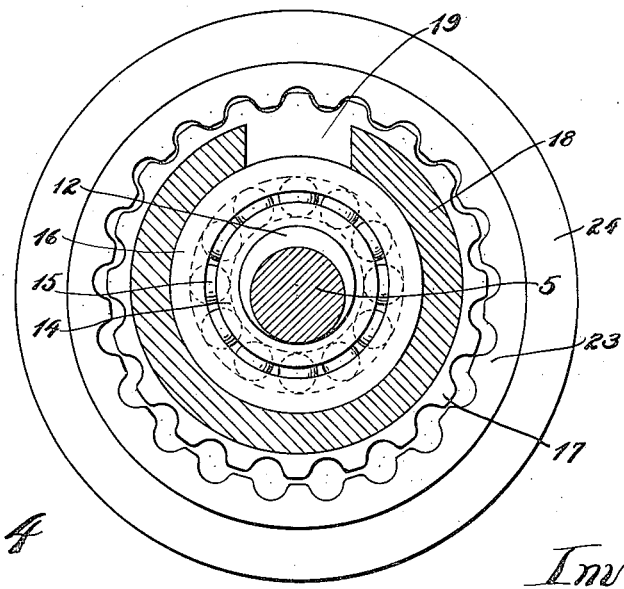
Figure 5:
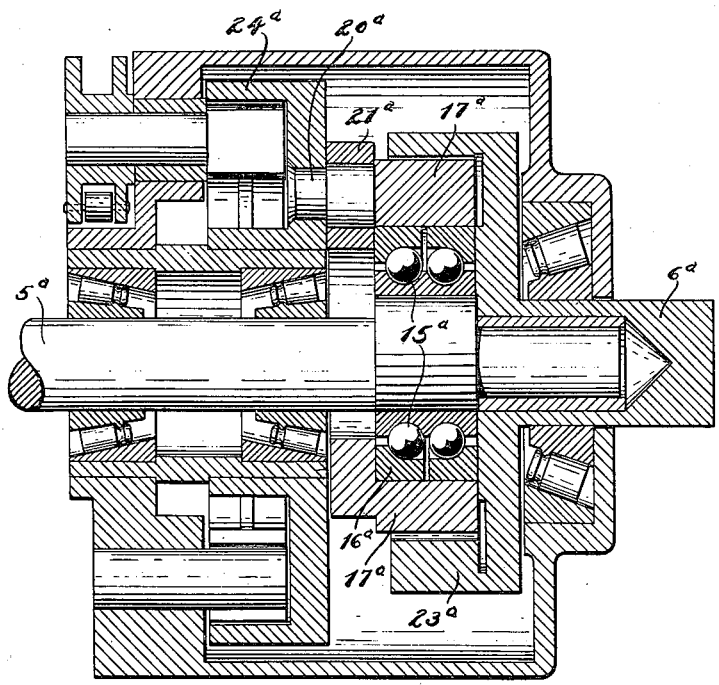

In the accompanying drawings wherein I have shown an illustrative embodiment of my invention, Fig. 1 is a top plan view of my device; Fig. 2 a sectional view taken on the line 2—2 of Fig. 1; Figs. 3 and 4 sectional views taken respectively on the lines 3—3 and 4—4 of Fig. 2; and Fig. 5 is a sectional view showing a modification of my transmission.

Describing the various parts by reference characters, 1 indicates the housing of my transmission which is preferably made of two pieces and bolted together as indicated at 2 in Figs. 1 and 3. An inwardly extending sleeve member 3, provided with the roller bearings 4—4, is securely clamped between the housing members at one end thereof, and journaled in said bearing is a shaft 5 which may be termed the driving shaft if it is assumed that the transmission is accomplishing a reduction of speed between the driving and driven shafts. At the opposite end of the housing 1, the driven shaft 6 is journaled in a roller bearing 7 and preferably formed integral with said shaft is a circular plate 8, the purpose of which will be more fully explained hereinafter. The shaft 6 is provided with a bore 9, into which, is positioned a bushing 10 which rotatably supports one end of the shaft 5. The driving shaft 5 is provided intermediate the ends thereof, with an eccentric portion 12 on which there is snugly fitted the inner race 14 of the ball bearing 15. The outer race 16 has snugly fitted thereon, the external gear 17 which is provided with a hub portion 18 into which a slot 19 is cut (Fig. 4). A stud shaft 20 projects from the plate 8 and has journaled thereon a hardened steel roller 21 which engages the slot 19 formed in the hub portion 18, thereby permitting eccentric movement of the gear 17 without binding and undue friction between the parts.

The external gear 17 meshes with a track or internal gear 23 which is floated on the sleeve member 3. The gear 23 is provided with a lateral flanged portion 24, the inner surface of which serves as a brake drum for the brake shoes 25—25. Referring to Fig. 3, it will be seen that each brake shoe is supported at the lower end of a hollow face lug 26 engaging the thrust pin 27 which is mounted in the lower half of the housing 1, and, at the upper end, each shoe is provided with a flat face lug 29 which engages the flattened portions 30 of a stud shaft 31 journaled in a bushing 32 mounted in the upper half of the housing. A spring 33 linked between the shoes serves to hold them out of engagement with the brake drum. The outer end of the stud shaft 31 has mounted thereon a spool or pulley 35 over which is positioned a chain 36 which is fastened thereto by means of a pin 37. Thus it will be apparent that a pull on chain 36 will cause stud shaft 31 to rotate which will expand the brake shoes 25—25 against the tension of spring 33 and engage the brake drum 24 to prevent it from rotating.

In operation the driving shaft will be connected to any suitable source of power to cause rotation thereof. With the brake disengaged the external gear 17 will not rotate but will reciprocate in a circular path thereby causing internal gear 23 to travel in the same direction. If the brake is now applied to hold the internal gear stationary, the external gear will track about the internal gear and impart a reverse rotation to plate 8 and shaft 6, the difference in speed between the shafts 5 and 6 being dependent upon the number of teeth in each gear. In the present instance I have shown the internal gear as having twenty-one teeth and the external gear as having twenty teeth which relation gives a twenty to one reduction in speed between the driving and driven shafts, it being understood however that the above is merely an illustration and that any desired relation may be provided without departing from the spirit of my invention.

It will be noted that the driven shaft rotates in a direction opposite to that of the driving shaft in the aforesaid described transmission. If it is desired to rotate both shafts in the same direction, I construct my transmission in accordance with that shown in Fig. 5 wherein the stud shafts $20^a$ is mounted on the brake drum $24^a$ and the hardened steel roller $21^a$ engages the external gear $17^a$ which is mounted on the outer race $16^a$ of ball bearing $15^a$. The internal gear or track $23^a$ is fastened to or formed integral with the driven shaft $6^a$. The remaining parts are constructed similar to those previously described.

In operation, the external gear $17^a$ would be prevented from rotating when the brake is engaged and merely reciprocate eccentrically, which motion would serve to drive gear $23^a$ and shaft $6^a$ in the same direction as the driving shaft $5^a$.

Having thus described my invention, what I claim is:—

1. In a device of the character described, the combination with a casing, of a sleeve projecting inwardly within said casing, a shaft journaled in said sleeve, an external gear eccentrically journaled on said shaft, an internal gear rotatably mounted on said sleeve and disposed in operative relation to said external gear, means adapted to connect said internal gear with said casing to prevent rotation thereof, a second shaft journaled in said casing and means for connecting said second shaft to said external gear whereby power may be transmitted between said shafts.

2. In a device of the character described, the combination with a casing, of a sleeve secured to and projecting within said casing, a shaft journaled in said sleeve, an external gear eccentrically journaled on said shaft, an internal gear rotatably mounted on said sleeve and disposed in operative relation to said external gear, a flange formed on said internal gear, a brake disposed in operative relation to said flange and adapted to be engaged therewith to prevent rotation of said internal gear, a second shaft journaled in said casing in axial alignment with said first mentioned shaft, a lever carried by said second shaft, and a roller journaled on said lever and engaged in an aperture formed in said external gear.

3. In a device of the character described, the combination with a two part casing, of a sleeve secured between the halves of said casing and projecting within said casing, a bearing disposed within said sleeve, a shaft journaled in said bearing, an eccentric formed on said shaft, an external gear journaled on said eccentric, an internal gear journaled on said sleeve and disposed in operative relation to said external gear, a flange formed on said internal gear, a brake associated with said flange, a second shaft journaled on the end of said first mentioned shaft, a lever carried by said second shaft, and a connection between said lever and said external gear.

In testimony whereof, I hereunto affix my signature.

HENRY C. BAINES.